United States Patent [19]

Marshall

[11] 3,950,995

[45] Apr. 20, 1976

[54] AMBIENT PRESSURE PROBE

[75] Inventor: Richard D. Marshall, Poolesville, Md.

[73] Assignee: The United States of America as represented by the Secretary of Commerce, Washington, D.C.

[22] Filed: Feb. 4, 1975

[21] Appl. No.: 546,968

[52] U.S. Cl. .................................. 73/388 R; 73/212
[51] Int. Cl.² ........................................... G01L 7/00
[58] Field of Search ................. 73/212, 182, 388 R, 73/420

[56] References Cited
UNITED STATES PATENTS

| | | | |
|---|---|---|---|
| 2,101,858 | 12/1937 | Knisley | 73/212 |
| 2,173,688 | 9/1939 | Karlsson et al. | 73/212 |
| 3,034,353 | 5/1962 | Anderson | 73/212 |

Primary Examiner—Donald O. Woodiel
Attorney, Agent, or Firm—David Robbins; Eugene J. Pawlikowski; Alvin J. Englert

[57] ABSTRACT

Ambient or static pressure in a fluid stream is sensed with a hollow circular cylinder placed normal to the fluid stream. A shroud is mounted on the cylinder for adjustment over a ring of ports provided in the cylinder. In this manner, the relationship between the internal pressure in the cylinder and the ambient pressure is controllable. Ideally, the internal and ambient pressures are exactly equal. Further, extension of the cylinder above and below the shroud provides symmetry for positive and negative angles of attack.

1 Claim, 3 Drawing Figures

TO PRESSURE GAUGE

AMBIENT PRESSURE PROBE

BACKGROUND OF THE INVENTION

1. Field of the Invention

This invention is related generally to an instrument for measuring parameters of an air flow, and particularly to the sensing of static pressure in atmospheric flows while compensating for wide variations in the angle of attack of the fluid flow relative to the sensing device.

2. Description of the Prior Art

Quantitative measurements of fluid flow are accomplished by a wide variety of instruments and techniques. The degree of accuracy required for a certain measurement depends on the application of the resulting information. While in some cases extreme accuracy is needed, only a rough estimate is required in other cases. In most industrial applications, even a slight error in measurements taken on large quantities of fluid can be very important.

Flow measurements frequently relate to the measurements of static or ambient pressure. Static pressure may be defined as pressure exerted by a fluid normal to stream lines of a flow of the fluid. This pressure will be constant across the flow in those situations where the formation streamlines are parallel to one another. If, for example, the streamlines are not parallel, but are curved, the static pressure will vary across the flow. A common technique for measuring the ambient or static pressure in a fluid stream relative to some reference pressure is by means of a pitot-static tube or probe. An aperture, generally referred to as a static pressure tap or a piezometer opening, is provided in the wall of the pitot-static tube. The pressure sensed by the aperture can be measured by any suitable device such as a manometer or a conventional pressure gauge.

The pitot-static tube measures the local and static pressure in a fluid flow by application of the principle of conservation of mechanical energy. This principle is applied by converting the velocity of the fluid flow into a pressure head. That is, if the fluid changes its velocity from $V_{s1}$ to $V_{s2}$ by application of a suitable force to the fluid flow, the pressure of the fluid will change from $p_{s1}$ to $p_{s2}$ in accordance with relationships known to those in the art. These relationships may be expressed by the equation:

$$V_{s2}^2 - V_{s1}^2 = (2g/d) \times (p_{s1} - p_{s2}),$$

where $g$ is the acceleration due to gravity, and $d$ is the density of the fluid.

If the pitot-static probe is not properly aligned with the flow, or if the flow is highly turbulent, the indicated static pressure tends to be lower than the true static pressure. Measuring barometric pressure under windy conditions, for example, necessitates mounting the pitot-static probe on a wind vane or similar device, to continuously align the probe with the oncoming wind. Further, problems often arise with the pressure ports becoming clogged with rain, snow, and the like.

U.S. Pat. No. 3,673,866, issued July 4, 1972 to Alperovich et al., discloses a pitot-static probe having an adjustable collar on the probe. Mounting the collar in front of the static pressure openings compensates for measuring errors where the static pressure is greater than the free-stream static pressure, while arranging the collar behind the openings compensates for errors encountered when the static pressure is lower than the free-stream static pressure. The static pressure measuring openings are exposed to rain, snow and the like, however, and may become clogged and variations in the angle of attack may cause errors which will not be compensated for the collar.

U.S. Pat. No. 3,443,431, issued May 13, 1969 to F. W. Hagen, discloses a static pressure sensing device intended to compensate for wide variations in the angle of attack between the device and associated flow stream. The measuring device has static pressure measuring openings along axes which are inclined forwardly from a position normal to the surface of the probe, rather than normal to the probe as is conventional. The openings are still exposed to the elements and are subject to clogging, and the probe would have to be mounted on a wind vane if it was to be used to measure barometric pressure under windy conditions.

SUMMARY OF THE INVENTION

It is the object of the present invention to provide an omni-directional ambient pressure sensing probe that does not require the use of a wind vane.

It is another object of the present invention to provide an ambient pressure sensing probe that has no moving parts and is operable under a wide range of atmospheric conditions.

It is yet another object of the present invention to provide an improved method for measuring ambient or static pressure in a fluid stream.

These and other objects are achieved according to the present invention by providing a static pressure probe having:

a hollow body provided with at least one pressure sensing port or aperture; and a shroud adjustably arranged on the body for movement relative to the aperture.

The hollow body is advantageously a hollow circular cylinder having a circumference provided with a ring of pressure sensing apertures arranged normal or perpendicular to the outer surface of the cylinder. The cylinder is usually placed vertically in an undisturbed wind field.

The shroud is preferably a sleeve arranged over, and spaced from, the cylinder. Means are associated with the sleeve for adjustably sealing a portion of the sleeve with respect to the cylinder. The position of the sleeve over the pressure ports determines the pressure in the cylinder.

As will become more apparent below, mounting the hollow cylinder perpendicular to an undisturbed wind field will result in the internal pressure of the cylinder and the ambient pressure of the fluid flow being equal for a certain position of the shroud relative to the ports.

BRIEF DESCRIPTION OF THE DRAWINGS

The invention will be clearly understood from the following detailed description of one particular embodiment of the invention, reference being made to the accompanying drawings.

DESCRIPTION OF THE PREFERRED EMBODIMENT

Figures 1, 2, 3:
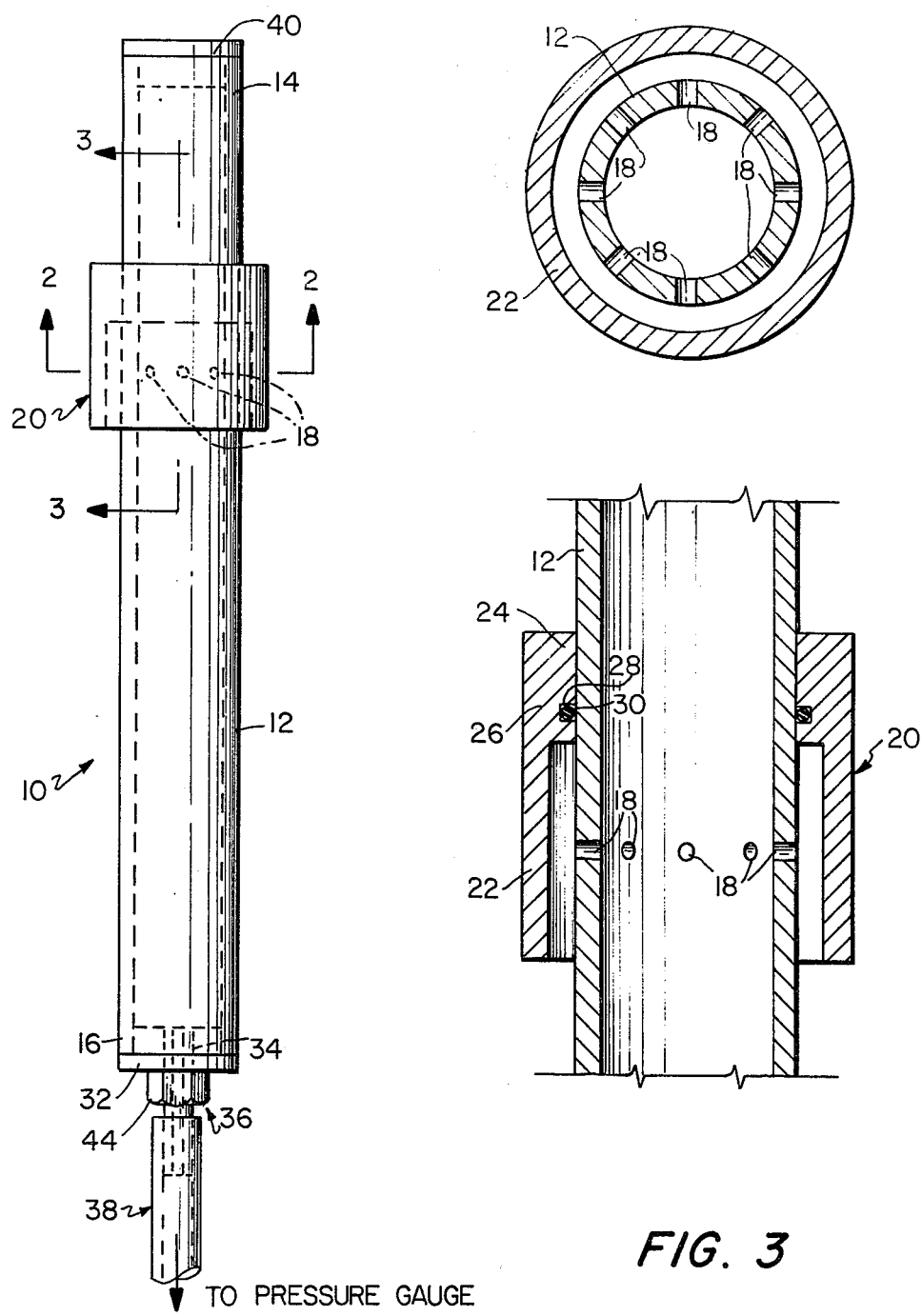
FIG. 1 is a fragmentary, side elevational view showing an ambient pressure probe according to the present invention.
FIG. 2 is a sectional view taken along the line 2—2 in FIG. 1.
FIG. 3 is a fragmentary, sectional view taken along the lines 3—3 in FIG. 1.

Referring now more particularly to FIGS. 1–3 of the drawings, an ambient pressure probe 10 according to the present invention is constructed from a hollow body in the form of a cylinder 12 having a pair of spacee ends 14 and 16 and provided with a plurality of apertures 18 forming a circumferential ring about the cylinder 12 intermediate its ends 14 and 16. A shroud 20 is adjustably mounted on cylinder 12 for movement relative to the ring of apertures 18. The latter are arranged perpendicularly to the outer cylindrical surface of cylinder 12 and form static pressure measuring ports.

Shroud 20 is advantageously in the form of a sleeve 22 disposed over and spaced from cylinder 12. Sleeve 22 is provided with an annular projection 24 which adjustably seals an end portion 26 of sleeve 22 to the cylinder 12. The seal is advantageously obtained by providing an annular groove 28 on the inner curved surface of projection 24 and placing a conventional "o"-ring 30 in the groove.

A plug 32 provided with a central bore 34 forms a fitting 36 for facilitating attachment of a pressure line 38 to cylinder 12. In this manner, the interior of cylinder 12 may be placed in communication with a conventional pressure measuring instrument such as a manometer or Bourdon pressure gauge. A plug 40, similar to plug 32 but without bore 34, may be used to close end 14 of cylinder 12. The probe is conveniently mounted on a supporting arm or bracket (not shown) secured between plug 32 and bolt 44.

If shroud 20 is positioned so that the apertures 18 are at or below the bottom of shroud 20, the internal pressure in cylinder 12 will be less than the atmospheric pressure. If, on the other hand, shroud 20 is positioned so that the apertures are near the top of shroud 20, the internal pressure in cylinder 12 will be greater than atmospheric pressure. As will be appreciated, there is a position of shroud 20, which is ascertainable by routine experimentation, for which the internal pressure in cylinder 12 will exactly equal the ambient pressure.

As will be readily appreciated from the above description and from the drawings, an ambient pressure probe according to the present invention is particularly suited for measuring turbulent atmospheric flows, and the like, over a wide range of variations in angle of attack. Further, the presence of shroud 20, particularly having projection 24 arranged at the upper portion thereof, helps prevent snow, rain and the like, from penetrating apertures 18 and clogging same.

While there has been shown and described a preferred inventive embodiment, obvious modifications thereto will be evident to those skilled in the art and the scope of the invention is therefore to be construed in accordance with the following claims.

What is claimed is:

1. An omnidirectional, weatherproof ambient pressure probe adapted for use in an undisturbed, predominantly horizontal wind field, comprising:
   a vertically mounted tube having a closed top and a ring of pressure ports intermediate its ends;
   a solid shroud adjustably sealed at its top about said tube and positioned over said ring of pressure ports to form a weatherproof, downwardly opening annular cavity about said ring of pressure ports, said shroud being positioned along said tube relative to said ports so that the pressure transmitted through said cavity and ports into said tube equals the true ambient pressure; and
   means for measuring said true ambient pressure in said tube.

* * * * *